United States Patent
Grob et al.

(10) Patent No.: US 6,687,592 B2
(45) Date of Patent: Feb. 3, 2004

(54) POWER TRAIN MONITORING

(75) Inventors: Ferdinand Grob, Besigheim (DE); Dietmar Arndt, Kleinsachsenheim (DE); Rolf Maier-Landgrebe, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 10/054,026

(22) Filed: Jan. 22, 2002

(65) Prior Publication Data

US 2002/0116108 A1 Aug. 22, 2002

(30) Foreign Application Priority Data

Jan. 23, 2001 (DE) .......................................... 101 02 773

(51) Int. Cl.$^7$ ................................................ G06G 7/10
(52) U.S. Cl. .............................. 701/54; 701/51; 701/29
(58) Field of Search .............................. 701/51, 54, 55, 701/67, 29, 68, 69; 477/34, 906; 74/335, 336 R, 337, 337.5; 180/65.2

(56) References Cited

U.S. PATENT DOCUMENTS

| 5,109,721 A | * | 5/1992 | Boardman et al. ........ 74/336 R |
| 5,819,194 A | * | 10/1998 | Hara et al. ..................... 701/69 |
| 6,220,109 B1 | * | 4/2001 | Fischer et al. ............. 74/337.5 |
| 6,554,088 B2 | * | 4/2003 | Severinsky et al. ........ 180/65.2 |

\* cited by examiner

*Primary Examiner*—Richard M. Camby
(74) *Attorney, Agent, or Firm*—Kenyon & Kenyon

(57) ABSTRACT

In a monitoring device for a vehicle including a drive engine, the monitoring device monitors the power train of the vehicle. The monitoring device includes an arrangement configured to generate a first signal which indicates a setpoint drive torque, a sensor system which measures an actual drive torque and generates a second signal which indicates the actual drive torque, and an analyzer which receives the first signal and the second signal in order to identify possible fault conditions in the power train of the vehicle. Furthermore, a method is for monitoring the power train of a vehicle, and a device is for performing the method.

25 Claims, 1 Drawing Sheet

POWER TRAIN MONITORING

FIELD OF THE INVENTION

The present invention relates to a monitoring device for a vehicle having a drive engine, to a method of monitoring the power train of a vehicle and to a device for performing the method.

BACKGROUND INFORMATION

It is conventional to monitor a plurality of functions and/or components of a motor vehicle for fault conditions in order to inform the driver of the vehicle about the occurrence of such fault conditions and/or to automatically trigger appropriate actions. Such conventional monitoring systems include, for example, monitoring of the coolant temperature, monitoring of the engine oil level and/or the oil pressure, etc. However, there are a plurality of additional possible fault conditions, the occurrence of which are not, or only seldom, monitored. The reason for this is mainly that a special sensor with a corresponding downstream analyzer is conventionally provided for each possible fault condition. Since this measure involves additional costs, it is often not used.

SUMMARY

By having the monitoring device according to the present invention monitor the power train of the vehicle, by providing an arrangement configured to generate a first signal that indicates a setpoint drive torque, by providing a sensor system that measures an actual drive torque and generates a second signal that indicates the actual drive torque, and by providing an analyzer that receives the first signal and the second signal in order to identify possible fault conditions in the power train of the vehicle, a plurality of components of the power train may be monitored in a cost-effective manner and associated fault conditions may be detected in a timely manner. This timely detection of fault conditions makes it possible to take countermeasures in many cases before components are damaged to the point that they need to be replaced.

The setpoint drive torque may include the torque delivered by the drive engine. Although the drive engine is usually configured as an internal combustion engine, the present invention is not limited to such an engine type. Instead, the present invention may also be used, for example, in connection with electric motors that may either form the only drive engine or a drive engine provided in addition to the internal combustion engine, for example, in hybrid vehicles.

The setpoint drive torque may be determined by a drive engine controller. Drive engine controllers, for example, electronic drive engine controllers, are used in a majority of motor vehicles. Characteristics maps, which are stored in an appropriate manner and through which the setpoint drive torque, for example, the torque delivered by the drive engine, may be obtained, are often used in conjunction with such drive engine controllers. It is also possible that the setpoint drive torque and/or the actual drive torque delivered by the drive engine may be measured by appropriate sensors. However, the setpoint drive torque may also be specified by a special device provided for that purpose, which may be implemented via logic circuits, microprocessors, memories, etc.

The sensor system used in the monitoring device according to the present invention may include a wheel force measuring sensor system. Using such a wheel force measuring sensor system, it is possible to determine the torque transmitted from the drive wheels to the road. Thus all losses occurring between the engine power take-off shaft and the drive wheels may be taken into account. The occurrence of losses may not be avoided even in the case of error-free operation. However, in the case of error-free operation of the power train, these losses do not exceed certain values, which depend on the vehicle type. These values may form the basis for determining limit values which, when exceeded, are identified as a fault condition.

In the monitoring device according to the present invention, the analyzer may determine a difference between the setpoint drive torque and the actual drive torque via the first signal and the second signal, and thus takes into account the instantaneous reduction ratio of a transmission, which is a component of the power train. The reduction ratio of the transmission may be taken into account whenever the setpoint drive torque is the torque of the engine take-off shaft, to which the transmission is connected downstream.

The analyzer may take into account the normal losses as described above, which may include friction losses, for example.

In an example embodiment of a monitoring device according to the present invention, the wheel force measurement is a highly dynamic wheel force measurement. With such a highly dynamic wheel force measurement, relevant information may also be obtained via the frequency spectrum, so that the entire monitoring device becomes much more sensitive.

When highly dynamic wheel force measurement is used, the analyzer may identify certain fault conditions via the frequency spectrum of the second signal. In this case, certain frequencies may be associated with certain possible fault conditions, for example. Which fault condition causes torque fluctuations of which frequency may be determined via tests and/or simulations, for example. The fault conditions concern not only mechanically defective components, but may also be formed, for example, by an excessively low lubricant level, etc.

The fault conditions may include one or more of the following fault conditions, for example: damaged clutch, cardan shaft running hot, wheel bearing defects, damaged transmission, damaged differential or insufficient lubricant, for example, in one of the above-mentioned components. In general, any component situated between the point of setpoint drive torque take-off and point of transmission of the actual drive torque may be monitored using the present invention.

In addition, the analyzer may also identify the condition of normal wear phenomena via the first signal and the second signal. Since normal wear phenomena do not cause any major differences between the setpoint drive torque and the actual drive torque, highly dynamic wheel force measurement may be used in this context.

Furthermore, the monitoring device according to the present invention may deliver a third signal to the drive engine controller so that the drive engine controller is able to take into account at least some of the possible fault conditions. In this context, it is possible, for example, that the maximum torque generated by the drive engine is automatically reduced upon occurrence of certain fault conditions in order to avoid consequential damage, for example.

The analyzer may deliver a fourth signal to a signaling device upon occurrence of a fault condition so that the driver of the vehicle may be informed about the fault condition(s)

detected. The signaling device may include a visual and/or acoustic signaling device, for example.

Due to the method according to the present invention of monitoring the power train of a vehicle includes the following steps:

a) determining a setpoint drive torque;
b) providing a sensor system and measuring an actual drive torque using the sensor system; and
c) evaluating the setpoint drive torque and the actual drive torque to identify a possible fault condition in the power train, a plurality of power train components may be monitored in a cost-effective manner and respective fault conditions may be detected in a timely manner.

This timely detection of fault conditions also makes it possible to take certain countermeasures in the context of the method according to the present invention in many cases before components are damaged to the point that they must be replaced or before hazardous conditions occur.

The setpoint drive torque may be the torque delivered by the drive engine also in the method according to the present invention.

As in the monitoring device according to the present invention, the setpoint drive torque may also be determined by a drive engine controller via the above-mentioned characteristics maps, for example, in the method according to the present invention.

The sensor system may include a wheel force measuring sensor system, reference being made to the advantages indicated above.

Step c) of the method according to the present invention may include the substep of forming a difference between the setpoint drive torque and the instantaneous drive torque. Also in this case, the current reduction ratio of a transmission considered part of the power train is to be taken into account if the transmission is situated between the point of setpoint drive torque take-off and point of transmission of the actual drive torque.

Method step c) may also includes the substep of taking into account normal losses. These normal losses may include, for example, unavoidable friction losses.

Furthermore, in the method according to the present invention, step b) may includes a highly dynamic wheel force measurement. As described above, a highly dynamic wheel force measurement may significantly increase the sensitivity of the method according to the present invention.

If a highly dynamic wheel force measurement is performed, step c) may also include the substep of taking into account a frequency spectrum of the actual drive torque in order to be able to identify fault conditions correlated with the frequency spectrum. One example of such a fault condition is an excessively low lubricant level in the differential.

The fault conditions may include one or more of the following fault conditions also in the method according to the present invention: damaged clutch, cardan shaft running hot, wheel bearing defects, damaged transmission, damaged differential, insufficient lubricant, it being possible to monitor any component situated between the point of setpoint drive torque take-off and point of transmission of the actual drive torque.

Method step c) may also include the substep of identifying the condition of normal wear phenomena. In this context, monitoring the clutch and/or the clutch lining is possible, for example.

The method according to the present invention may include the following additional step in certain example embodiments:

d) notifying the drive engine controller of detected fault conditions and/or wear phenomena.

Through this step d) the drive engine controller, for example, is enabled to take appropriate countermeasures.

As an alternative or in addition to step d), the method according to the present invention may also include the following additional step:

e) notifying the driver of the vehicle of detected fault conditions and/or wear phenomena.

Also in this case, notification may occur visually or acoustically, for example.

DETAILED DESCRIPTION

Figure 1:
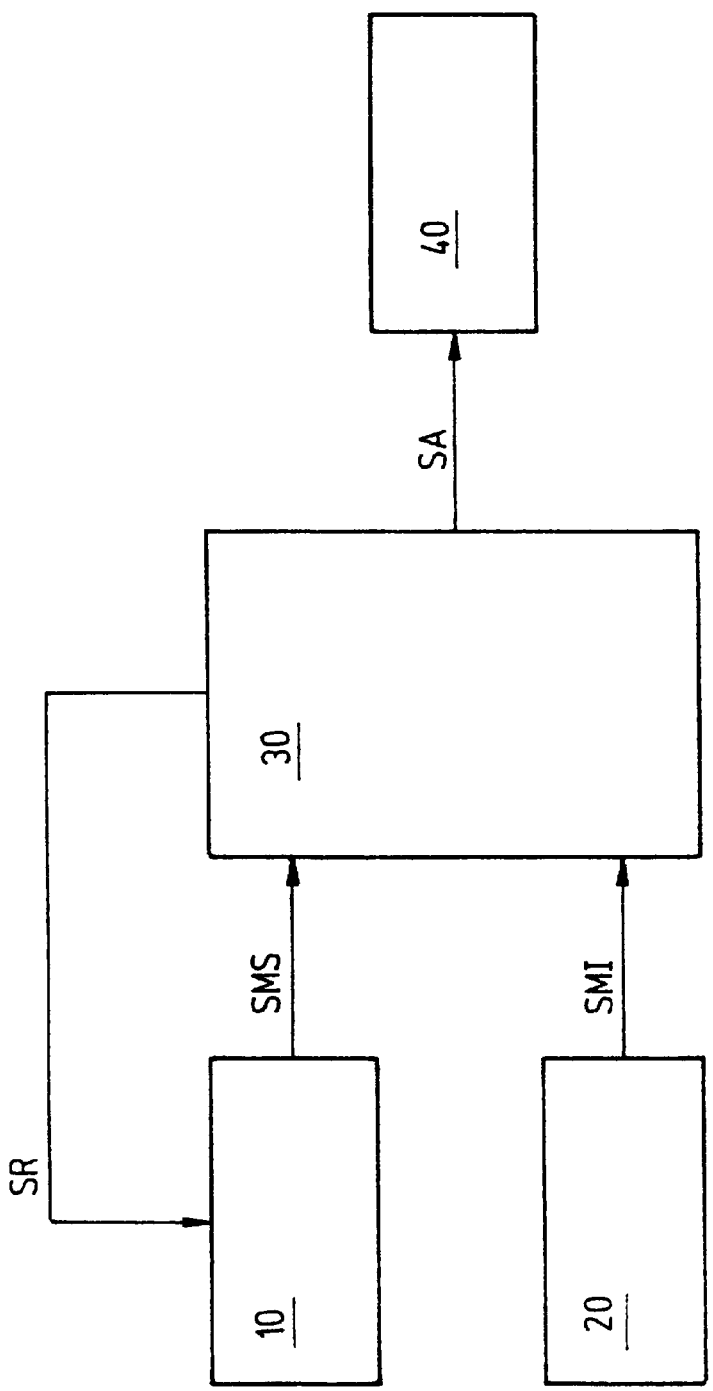
FIG. 1 is a schematic block diagram of an example embodiment of the monitoring device according to the present invention.

As illustrated in FIG. 1, block 10 is an arrangement configured to generate a first signal SMS indicating a setpoint drive torque. This arrangement 10 may be formed, for example, by a drive engine controller. A sensor system 20 measures the actual drive torque and delivers a second signal SMI that indicates this actual drive torque. Sensor system 20 may be formed by a highly dynamic wheel force measuring sensor system, since in this case all components of the power train may be monitored for corresponding fault conditions.

Analyzer 30 determines, via first signal SMS and second signal SMI, a difference between the setpoint drive torque and the actual drive torque. In doing so, analyzer 30 takes into account the instantaneous reduction ratio of a transmission, which is a component of the power train. Furthermore, analyzer 30 takes into account normal losses in the power train, which may include friction losses, for example. Analyzer 30 delivers to drive engine controller 10 a third signal SR. This third signal SR specifies, for example, certain fault conditions, whereby drive engine controller 10 is enabled to initiate appropriate actions in order to prevent consequential damages, for example. These actions may include, for example, reduction of the drive engine torque or reduction of the maximum speed of the vehicle, etc. Analyzer 30 is furthermore connected to a signaling device 40 and supplies the same with a fourth signal SA. Using this fourth signal SA, signaling device 40 is capable of signaling to the driver in an appropriate manner that a certain fault condition has occurred. For this purpose, the signaling device may be able to signal one or more fault conditions, for example, visually or acoustically.

The present invention thus makes it possible, for example, to recognize a damaged clutch, a cardan shaft running hot, wheel bearing defects, a damaged transmission, a damaged differential, or an insufficient lubricant level, in a timely manner as a fault condition thus preventing or at least limiting consequential damage, for example.

The foregoing description of the example embodiments according to the present invention is only for purposes of illustration and does not limit the scope of the present invention. Various alterations and modifications are possible within the context of the present invention without limiting the scope of the invention or its equivalents.

What is claimed is:

1. A monitoring device for a vehicle including a drive engine, the monitoring device configured to monitor a power train of the vehicle, comprising:

an arrangement configured to generate a first signal that specifies a setpoint drive torque;

a sensor system configured to measure an actual drive torque and to generate a second signal that indicates an actual drive torque; and an analyzer configured to receive the first signal and the second signal to identify a fault condition in the power train of the vehicle.

2. The monitoring device according to claim 1, wherein the setpoint drive torque includes a torque delivered by the drive engine.

3. The monitoring device according to claim 1, further comprising a drive engine controller configured to determine the setpoint drive torque.

4. The monitoring device according to claim 1, wherein the sensor system includes a wheel force measuring sensor system.

5. The monitoring device according to claim 1, wherein the analyzer is configured to determine a difference between the setpoint drive torque and the actual drive torque via the first signal and the second signal and to takes into account an instantaneous reduction ratio of a transmission.

6. The monitoring device according to claim 1, wherein the analyzer is configured to take into account normal losses in the power train.

7. The monitoring device according to claim 4, wherein the wheel force measuring sensor is configured to perform a highly dynamic wheel force measurement.

8. The monitoring device according to claim 1, wherein the analyzer is configured to identify certain fault conditions via a frequency spectrum of the second signal.

9. The monitoring device according to claim 1, wherein the fault condition includes at least one of a damaged clutch, a cardan shaft running hot, wheel bearing defects, a damaged transmission, a damaged differential and an insufficient lubricant.

10. The monitoring device according to claim 1, wherein the analyzer is configured to identify a condition of normal wear phenomena via the first signal and the second signal.

11. The monitoring device according to claim 1, wherein the analyzer is configured to deliver a third signal to a drive engine controller so that the drive engine controller is able to take into account at least one fault condition.

12. The monitoring device according to claim 1, wherein the analyzer is configured to deliver a fourth signal to a signaling device to inform a driver of the vehicle about detected fault conditions.

13. A method of monitoring a power train of a vehicle, comprising the steps of:

determining a setpoint drive torque;

providing a sensor system and measuring an actual drive torque using a sensor system; and evaluating the setpoint drive torque and the actual drive torque to identify a fault condition in the power train.

14. The method according to claim 13, wherein the setpoint drive torque includes a torque delivered by a drive engine.

15. The method according to claim 13, wherein the setpoint drive torque is determined in the determining step by a drive engine controller.

16. The method according to claim 13, wherein the sensor system includes a wheel force measuring sensor system.

17. The method according to claim 13, wherein the evaluating step includes the substep of forming a difference between the setpoint drive torque and the actual drive torque, an instantaneous reduction ratio of a transmission being taken into account.

18. The method according to claim 13, wherein the evaluating step includes the substep of taking into account normal losses in the power train.

19. The method according to claim 13, wherein the measuring step includes a highly dynamic wheel force measurement.

20. The method according to claim 13, wherein the evaluating step includes the substep of taking into account a frequency spectrum of the actual drive torque in order to identify fault conditions correlated with the frequency spectrum.

21. The method according to claim 13, wherein the fault condition includes at least one of a damaged clutch, a cardan shaft running hot, wheel bearing defects, a damaged transmission, a damaged differential, and an insufficient lubricant.

22. The method according to claim 13, wherein the evaluating step includes the substep of identifying a condition of normal wear phenomena.

23. The method according to claim 13, further comprising the step of notifying a drive engine controller of at least one of detected fault conditions and wear phenomena.

24. The method according to claim 13, further comprising the step of notifying a driver of the vehicle of at least one of detected fault conditions and wear phenomena.

25. A device configured to perform a method of monitoring a power train of a vehicle, the method comprising the steps of:

determining a setpoint drive torque;

providing a sensor system and measuring an actual drive torque using a sensor system; and evaluating the setpoint drive torque and the actual drive torque to identify a fault condition in the power train.

* * * * *